(12) United States Patent
Gholmieh et al.

(10) Patent No.: US 9,143,901 B2
(45) Date of Patent: Sep. 22, 2015

(54) GROUP ID AND QOS GROUP IDENTIFICATION FOR STREAM MULTIPLEXING IN MULTICAST AND BROADCAST SYSTEMS

(75) Inventors: Ralph A. Gholmieh, San Diego, CA (US); Nagaraju Naik, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 101 days.

(21) Appl. No.: 13/436,367

(22) Filed: Mar. 30, 2012

(65) Prior Publication Data

US 2012/0300688 A1 Nov. 29, 2012

Related U.S. Application Data

(60) Provisional application No. 61/491,030, filed on May 27, 2011.

(51) Int. Cl.
*H04W 4/06* (2009.01)
*H04W 4/08* (2009.01)

(52) U.S. Cl.
CPC .. *H04W 4/08* (2013.01); *H04W 4/06* (2013.01)

(58) Field of Classification Search
CPC .......................................................... H04W 4/08
USPC ............ 455/452.1, 451, 452.2, 512; 370/336, 370/337, 349, 312
See application file for complete search history.

(56) References Cited

U.S. PATENT DOCUMENTS

| | | | |
|---|---|---|---|
| 7,630,362 B1 * | 12/2009 | Jeffrey et al. | 370/367 |
| 2003/0002577 A1 * | 1/2003 | Pinder | 375/240.01 |
| 2003/0053434 A1 * | 3/2003 | Chow et al. | 370/338 |
| 2005/0169203 A1 * | 8/2005 | Sinnarajah et al. | 370/312 |
| 2005/0207372 A1 * | 9/2005 | Beckmann et al. | 370/329 |
| 2006/0268738 A1 * | 11/2006 | Goerke et al. | 370/254 |
| 2007/0172061 A1 * | 7/2007 | Pinder | 380/240 |

(Continued)

FOREIGN PATENT DOCUMENTS

| | | | | |
|---|---|---|---|---|
| CN | 101958828 | * | 7/2009 | H04N 7/52 |
| CN | 101958828 A | | 1/2011 | |

(Continued)

OTHER PUBLICATIONS

International Search Report and Written Opinion—PCT/US2012/036971—ISA/EPO—Aug. 22, 2012 (111832WO).
Taiwan Search Report—TW101116974—TIPO—Mar. 18, 2015 (111832TW).

*Primary Examiner* — Parth Patel
(74) *Attorney, Agent, or Firm* — The Marbury Law Group, PLLC

(57) ABSTRACT

Various embodiments provide methods and systems for identifying statistically multiplexed groups of services and coordinating the groups of services for multicast or broadcast over the same transmission channels. Further embodiments provide methods and systems for providing quality of service requirements for groups or subgroups of statistically multiplexed services. Coordination of the groups of services for multicast or broadcast over the same transmission channels may be based on the provided quality of service requirements. Various embodiments may identify groups of services and provide associated of service requirements by sending modified session start messages or separate group messages.

25 Claims, 17 Drawing Sheets

(56) References Cited

U.S. PATENT DOCUMENTS

| | | |
|---|---|---|
| 2008/0062178 A1* | 3/2008 | Khandekar et al. ............ 345/440 |
| 2008/0090583 A1* | 4/2008 | Wang et al. ................. 455/452.1 |
| 2008/0095071 A1 | 4/2008 | Lu et al. |
| 2010/0284292 A1* | 11/2010 | You et al. ........................ 370/252 |
| 2011/0069614 A1* | 3/2011 | Baumgartner ................ 370/235 |
| 2012/0069785 A1* | 3/2012 | Zhang et al. .................. 370/312 |

FOREIGN PATENT DOCUMENTS

| | | | |
|---|---|---|---|
| EP | 2427014 A1 | 3/2012 | |
| WO | 2007076486 A2 | 7/2007 | |
| WO | WO2010124411 * | 7/2007 | ............ H04W 72/08 |
| WO | 2010124411 A1 | 11/2010 | |

* cited by examiner

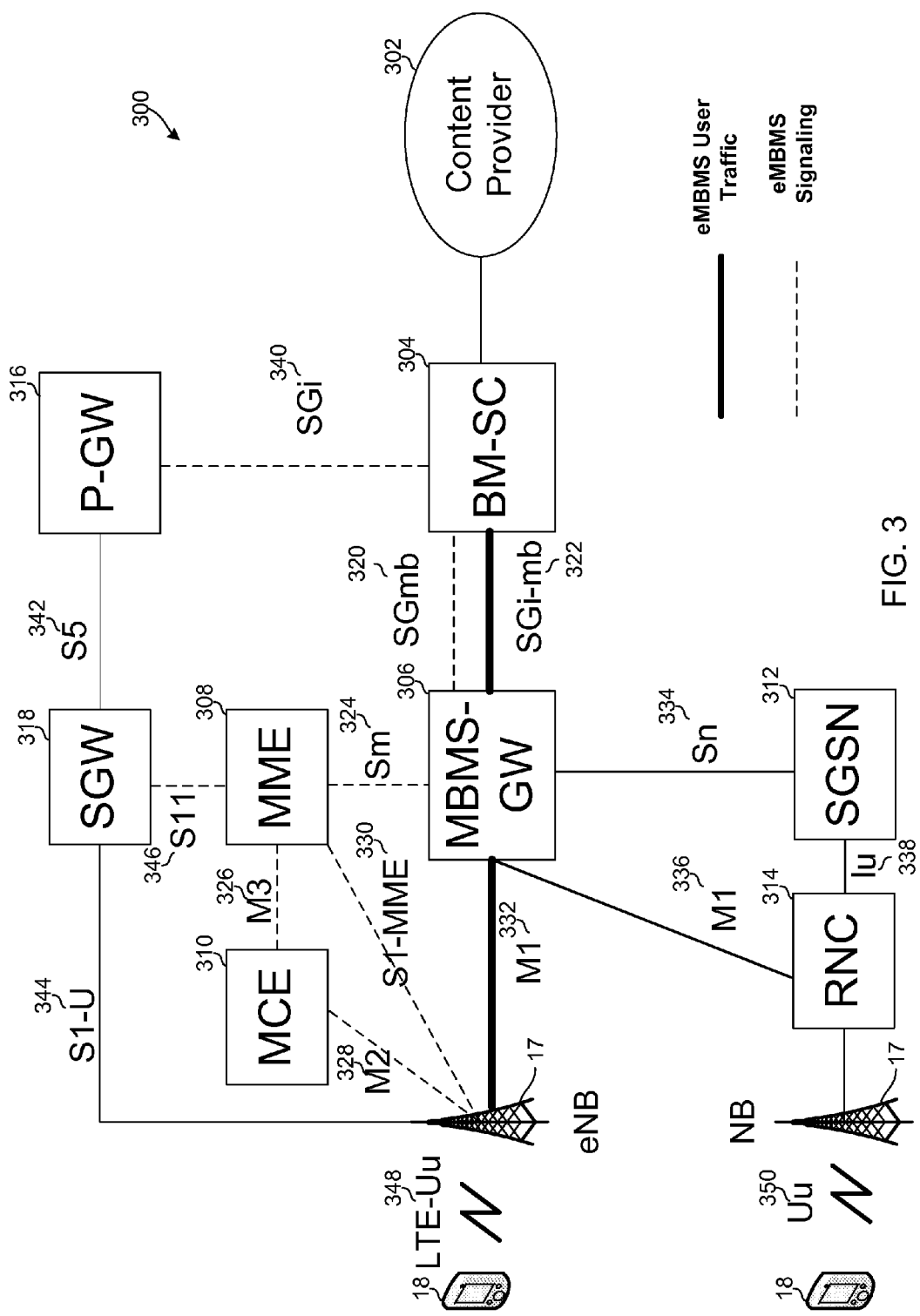

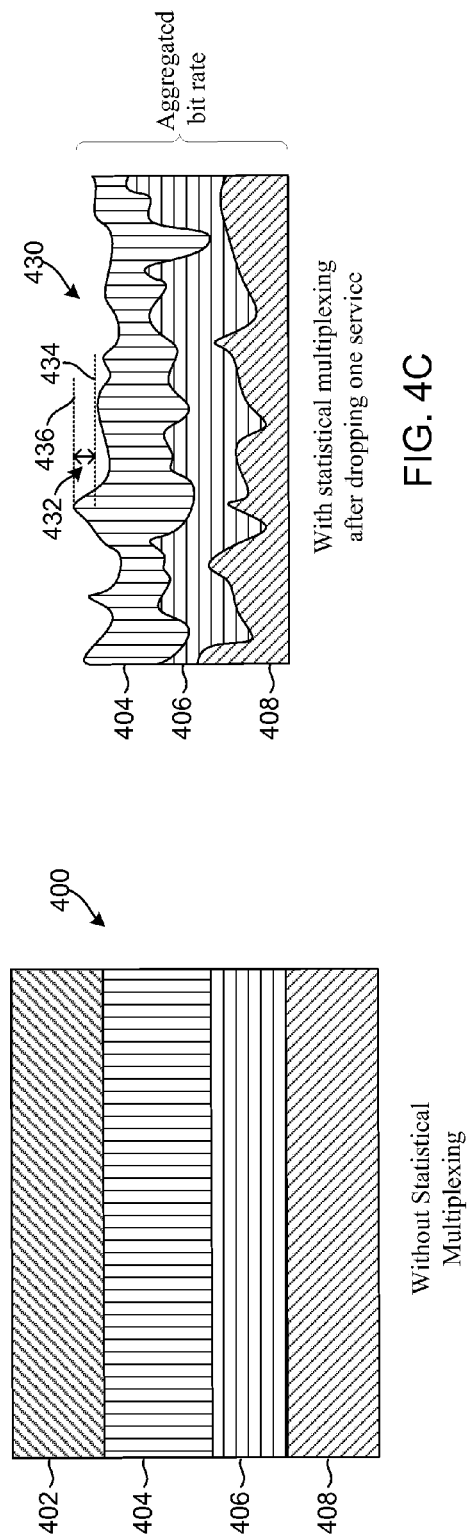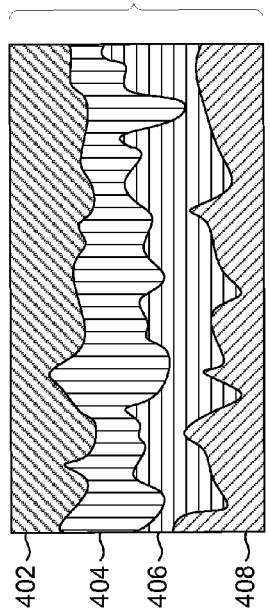

```
<RAR> ::= < Diameter Header: 258, REQ, PXY >
    < Session-Id >
    { Origin-Host }
    { Origin-Realm }
    { Destination-Realm }
    { Destination-Host }
    { Auth-Application-Id }
    { Re-Auth-Request-Type }
    [ Called-Station-Id ]
    [ Framed-IP-Address]
    [ Framed-IPv6-Prefix ]
    [ Framed-Interface-Id ]
    [ MBMS-Access-Indicator ]
    [ MBMS-StartStop-Indication ]      // Start or Stop command
    [ MBMS-Service-Area ]              // Broadcast Area
    [ QoS-Information ]                // QoS-Class-Identifier, Max-Requested-
                                       // Bandwidth-DL, Guaranteed-Bitrate-DL,
    602                                // and Allocation-Retention-Priority AVPs
    [ MBMS-Session-Duration ]
    [ MBMS-Session-Identity ]          // Optional
    [ MBMS-Session-Repetition-number ]
    [ TMGI ]                           // Assigned by BM-SC
*   [ 3GPP-SGSN-Address ]
*   [ 3GPP-SGSN-IPv6-Address ]
    [ MBMS-Time-To-Data-Transfer ]
    [ MBMS-User-Data-Mode-Indication ]
    [ MBMS-BMSC-SSM-IP-Address ]
    [ MBMS-BMSC-SSM-IPv6-Address ]
    [ MBMS-Flow-Identifier ]           // for local service purposes
    [ CN-IP-Multicast-Distribution ]
    [ MBMS-HC-Indicator ]
    [ Origin-State-Id ]
*   [ Proxy-Info ]
*   [ Route-Record ]
```

FIG. 6

| IE/Group Name | Presence | IE type and reference | Semantics description | Criticality | Assigned Criticality |
|---|---|---|---|---|---|
| MBMS E-RAB QoS Parameters | | | | | |
| >QCI | M | INTEGER (0..255) | QoS Class Identifier defined in [6]. Coding is specified in [7]. | | |
| >GBR QoS Information | O | .5 | This IE applies to GBR bearers only and shall be ignored otherwise. | YES | |
| >Allocation and Retention Priority | M | .x | | | ignore |

FIG. 7

```
<RAR> ::= < Diameter Header: 258, REQ, PXY >                    800
    < Session-Id >
    { Origin-Host }
    { Origin-Realm }
    { Destination-Realm }
    { Destination-Host }
    { Auth-Application-Id }
    { Re-Auth-Request-Type }
    [ Called-Station-Id ]
    [ Framed-IP-Address]
    [ Framed-IPv6-Prefix ]
    [ Framed-Interface-Id ]
    [ MBMS-Access-Indicator ]
    [ MBMS-StartStop-Indication ]      // Start or Stop command
    [ MBMS-Service-Area ]              // Broadcast Area
    [ QoS-Information ]                // QoS-Class-Identifier, Max-Requested-
                                       // Bandwidth-DL, Guaranteed-Bitrate-DL,
802                                    // and Allocation-Retention-Priority AVPs
    [ Group ID ]
    [ MBMS-Session-Duration ]
    [ MBMS-Session-Identity ]          // Optional
    [ MBMS-Session-Repetition-number ]
    [ TMGI ]                           // Assigned by BM-SC
  * [ 3GPP-SGSN-Address ]
  * [ 3GPP-SGSN-IPv6-Address ]
    [ MBMS-Time-To-Data-Transfer ]
    [ MBMS-User-Data-Mode-Indication ]
    [ MBMS-BMSC-SSM-IP-Address ]
    [ MBMS-BMSC-SSM-IPv6-Address ]
    [ MBMS-Flow-Identifier ]           // for local service purposes
    [ CN-IP-Multicast-Distribution ]
    [ MBMS-HC-Indicator ]
    [ Origin-State-Id ]
  * [ Proxy-Info ]
  * [ Route-Record ]
```

FIG. 8

```
<RAR> ::= < Diameter Header: 258, REQ, PXY >                              900
    < Session-Id >
    { Origin-Host }
    { Origin-Realm }
    { Destination-Realm }
    { Destination-Host }
    { Auth-Application-Id }
    { Re-Auth-Request-Type }
    [ Called-Station-Id ]
    [ Framed-IP-Address]
    [ Framed-IPv6-Prefix ]
    [ Framed-Interface-Id ]
    [ MBMS-Access-Indicator ]
    [ MBMS-StartStop-Indication ]       // Start or Stop command
    [ MBMS-Service-Area ]               // Broadcast Area
    [ QoS-Information ]                 // QoS-Class-Identifier, Max-Requested-
                                        // Bandwidth-DL, Guaranteed-Bitrate-DL,
                                        // and Allocation-Retention-Priority AVPs,
                                        // Group ID
                                              902
    [ MBMS-Session-Duration ]
    [ MBMS-Session-Identity ]           // Optional
    [ MBMS-Session-Repetition-number ]
    [ TMGI ]                            // Assigned by BM-SC
*   [ 3GPP-SGSN-Address ]
*   [ 3GPP-SGSN-IPv6-Address ]
    [ MBMS-Time-To-Data-Transfer ]
    [ MBMS-User-Data-Mode-Indication ]
    [ MBMS-BMSC-SSM-IP-Address ]
    [ MBMS-BMSC-SSM-IPv6-Address ]
    [ MBMS-Flow-Identifier ]            // for local service purposes
    [ CN-IP-Multicast-Distribution ]
    [ MBMS-HC-Indicator ]
    [ Origin-State-Id ]
*   [ Proxy-Info ]
*   [ Route-Record ]
```

FIG. 9

| IE/Group Name | Presence | IE type and reference | Semantics description | Criticality | Assigned Criticality |
|---|---|---|---|---|---|
| MBMS E-RAB QoS Parameters | | | | | |
| >QCI | M | INTEGER (0..255) | QoS Class Identifier defined in [6]. Coding is specified in [7]. | | |
| >GBR QoS Information | O | .5 | This IE applies to GBR bearers only and shall be ignored otherwise. Includes 2 fields:: requested max bit rate, and requested guaranteed bit rate | | |
| >Allocation and Retention Priority | M | .x | | YES | ignore |
| >Group ID | O | Integer (0..255) | Sessions with the same Group ID are jointly stat-multiplexed. | | |

FIG. 10

```
<RAR> ::= < Diameter Header: 258, REQ, PXY >                                    ↙100
          < Session-Id >
          { Origin-Host }
          { Origin-Realm }
          { Destination-Realm }
          { Destination-Host }
          { Auth-Application-Id }
          { Re-Auth-Request-Type }
          [ Called-Station-Id ]
          [ Framed-IP-Address]
          [ Framed-IPv6-Prefix ]
          [ Framed-Interface-Id ]
          [ MBMS-Access-Indicator ]
          [ MBMS-StartStop-Indication ]        // Start or Stop command
          [ MBMS-Service-Area ]                // Broadcast Area
          [ QoS-Information ]                  // QoS-Class-Identifier, Max-Requested-
                                               // Bandwidth-DL, Guaranteed-Bitrate-DL,
  802╲                                         // and Allocation-Retention-Priority AVPs
          [ Group ID ]
          [ Group-QOS-Information ]⌒— 1102
          [ MBMS-Session-Duration ]
          [ MBMS-Session-Identity ]            // Optional
          [ MBMS-Session-Repetition-number ]
          [ TMGI ]                             // Assigned by BM-SC
       *  [ 3GPP-SGSN-Address ]
       *  [ 3GPP-SGSN-IPv6-Address ]
          [ MBMS-Time-To-Data-Transfer ]
          [ MBMS-User-Data-Mode-Indication ]
          [ MBMS-BMSC-SSM-IP-Address ]
          [ MBMS-BMSC-SSM-IPv6-Address ]
          [ MBMS-Flow-Identifier ]             // for local service purposes
          [ CN-IP-Multicast-Distribution ]
          [ MBMS-HC-Indicator ]
          [ Origin-State-Id ]
       *  [ Proxy-Info ]
       *  [ Route-Record ]
```

FIG. 11

```
<RAR> ::= < Diameter Header: 258, REQ, PXY >
    < Session-Id >                                             1200
    { Origin-Host }
    { Origin-Realm }
    { Destination-Realm }
    { Destination-Host }
    { Auth-Application-Id }
    { Re-Auth-Request-Type }
    [ Called-Station-Id ]
    [ Framed-IP-Address]
    [ Framed-IPv6-Prefix ]
    [ Framed-Interface-Id ]
    [ MBMS-Access-Indicator ]
    [ MBMS-StartStop-Indication ]      // Start or Stop command
    [ MBMS-Service-Area ]              // Broadcast Area
    [ QoS-Information ]                // QoS-Class-Identifier, Max-Requested-
                                       // Bandwidth-DL, Guaranteed-Bitrate-DL,
                                       // and Allocation-Retention-Priority AVPs,
                                       // Group-Max-Requested-Bandwidth-DL,
                                       // Group-Guaranteed-Bitrate-DL
                                                                      1202
    [ MBMS-Session-Duration ]
    [ MBMS-Session-Identity ]          // Optional
    [ MBMS-Session-Repetition-number ]
    [ TMGI ]                           // Assigned by BM-SC
*   [ 3GPP-SGSN-Address ]
*   [ 3GPP-SGSN-IPv6-Address ]
    [ MBMS-Time-To-Data-Transfer ]
    [ MBMS-User-Data-Mode-Indication ]
    [ MBMS-BMSC-SSM-IP-Address ]
    [ MBMS-BMSC-SSM-IPv6-Address ]
    [ MBMS-Flow-Identifier ]           // for local service purposes
    [ CN-IP-Multicast-Distribution ]
    [ MBMS-HC-Indicator ]
    [ Origin-State-Id ]
*   [ Proxy-Info ]
*   [ Route-Record ]
```

FIG. 12

| IE/Group Name | Presence | IE type and reference | Semantics description | Criticality | Assigned Criticality |
|---|---|---|---|---|---|
| MBMS E-RAB QoS Parameters | | | | | |
| >QCI | M | INTEGER (0..255) | QoS Class Identifier defined in [6]. Coding is specified in [7]. | | |
| >GBR QoS Information | O | .5 | This IE applies to GBR bearers only and shall be ignored otherwise. | | |
| >Allocation and Retention Priority | M | .x | | YES | ignore |
| >Group GBR QoS Information | O | | This IE applies to Groups with GBR bearers only and shall be ignored otherwise. | | |

GROUP ID AND QOS GROUP IDENTIFICATION FOR STREAM MULTIPLEXING IN MULTICAST AND BROADCAST SYSTEMS

CROSS-REFERENCE TO RELATED APPLICATIONS

This application claims the benefit of priority to U.S. Provisional Patent Application Ser. No. 61/491,030 filed May 27, 2011, which is hereby incorporated herein by reference in its entirety.

BACKGROUND

Wireless communication technologies have seen explosive growth over the past few years. A recent addition to wireless communication technologies has been the ability to broadcast a wide range of content, including television and video content, to mobile receiver devices. Mobile broadcast users can receive a wide variety of content, social media, and video, such as mobile editions of news, entertainment, sports, business, and other programming, and using their cell phone or other wireless devices. These broadcast systems have seen significant increase in usage and availability worldwide.

SUMMARY

The various embodiments include systems and methods for efficiently multiplexing a plurality of channels for transmission from a central content collection facility to various remote broadcast networks so that a plurality of groups of services that are statistically multiplexed together can be broadcast in common channels in order to achieve the maximum benefit from statistical multiplexing. In one or more embodiments, systems and methods include forming statistical multiplex groups of the plurality of services intended for multicasting or broadcasting, associating a group ID with each of the statistical multiplex groups, providing a session start message corresponding to a service, the session start message comprising the group ID associated with the statistical multiplex group, and coordinating the multicasting or broadcasting of these services over one or more transmission channels based on the session start message such that services are grouped based on the statistical multiplex group.

Further embodiments include systems and methods for multicasting or broadcasting a plurality of services, including forming statistical multiplex groups around each of a plurality of groups of services, associating a group ID with each of the statistical multiplex groups, providing a group message comprising a data structure including each group ID, associated statistical multiplex group, and group of services, and coordinating multicasting or broadcasting of services over a plurality of channels based on the group message such that services are grouped based on the statistical multiplex groups.

Further embodiments provide systems and methods for multicasting or broadcasting a plurality of services, including forming statistical multiplex groups around each of the plurality of groups of services, associating a group ID and group quality of service requirements with each of the statistical multiplex groups, providing a session start message corresponding to a service, the session start message comprising the group ID and group quality of service requirements associated with the statistical multiplex group formed around the group of services including the service corresponding to the session start message, and coordinating services into a plurality of channels based on the session start message such that services are grouped based on the statistical multiplex groups.

Further embodiments provide systems and methods for multicasting or broadcasting a plurality of services, including forming statistical multiplex groups around each of the plurality of groups of services, associating a group ID and group quality of service requirements with each of the statistical multiplex groups, providing a group message comprising a data structure including each group ID, associated statistical multiplex group, group of services, and group quality of service requirements, and coordinating services into a plurality of channels based on the group message such that services are grouped based on the statistical multiplex groups.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 3 is system block diagram of an enhanced Multimedia Broadcast Multicast Service (eMBMS) system suitable for use with the various embodiments.

FIGS. 4A, 4B, and 4C are plots showing how services may require less total bandwidth for transmission after being statistically multiplexed.

FIG. 6 is an example format of a session start command

FIG. 7 is an example format of the parameters of a quality of service (QoS) information element (IE).

FIG. 8 is an example format of a session start command with a Group identifier (ID) IE.

FIG. 9 is an example format of a session start command with a modified QoS-Information IE.

FIG. 10 is an example format of the parameters of a modified QoS IE.

FIG. 11 is an example format of a session start command with Group ID and Group-QoS-Information IEs.

FIG. 12 is an example format of a session start command with a modified QoS-Information IE.

FIG. 13 is an example format of the parameters of a modified QoS IE.

DETAILED DESCRIPTION

Figure 1:
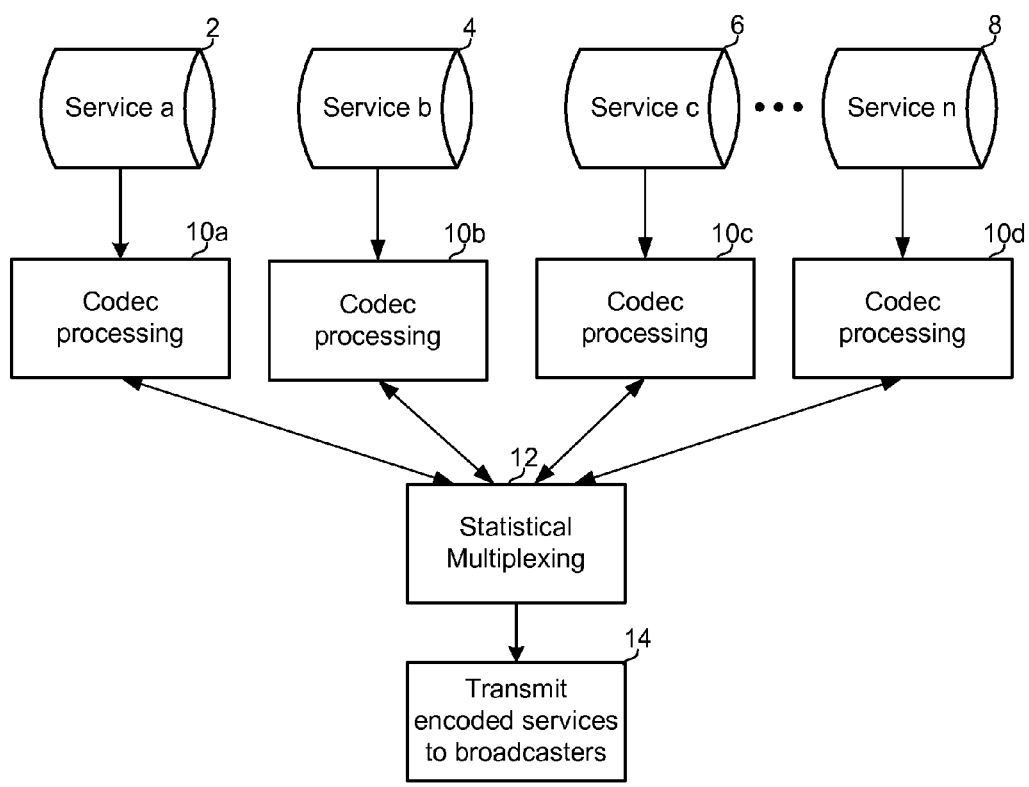
FIG. 1 is a process flow diagram of a conventional method for generating a multiplex signal for broadcast from a plurality of service feeds.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "services" applies to different streams of content, such as text feeds, HTML feeds, and audio and video feeds, that may be included within a single broadcast signal, such as a multicast transmission or a mobile broadcast TV signal, or within a single transmission signal, such as a cable TV signal. Such services may be organized and accessible as if they were different broadcast "channels," but since the content may be multiplexed within a single signal of a single frequency band or complex of multiple frequency bands, the content may not be on separate or distinct frequencies or channels per se. For example, mobile broadcast TV technologies may broadcasts several "services," many of which correspond to programs of conventional television stations or broadcasters (e.g., ABC, CBS, NBC, etc.). Typically each service is provided by a different service provider which may be the producer or owner of the audio/video content making up the service.

As used herein, the terms "multiplex" and "multiplex signal" refer to a combined signal containing the data signals of a plurality of different services. In a particular example, a multiplex signal may be a combined signal containing multiple services that is formatted into a signal block or superframe for broadcast over a broadcast network, such as a multicast network or a mobile broadcast TV network. As used herein, the terms "sub-multiplex" and "sub-multiplex signal" refer to a combined signal containing the data signals of a plurality of different services that may be combined with another sub-multiplex signal to form the multiplex signal that is broadcast over a broadcast network.

The various embodiments provide methods and systems for identifying statistically multiplexed groups of services included in a multiplexed transmission, and coordinating the groups of services into the same channels for broadcast in order to ensure bandwidth optimization benefits of statistical multiplexing are available to the broadcasts. This coordinating of groups of services may be accomplished so that services are grouped based on the statistical multiplex group. Further embodiments provide methods and systems for providing quality of service requirements for groups or subgroups of statistically multiplexed services. Coordination of the groups of services into the same channels for transmission may be based on the provided quality of service requirements. Various embodiments may identify groups of services and provide associated quality of service requirements by sending modified session start messages or separate group messages.

A number of different mobile broadcast television services and broadcast standards are available or contemplated in the future, all of which may implement and benefit from the various embodiments. Such services and standards include Open Mobile Alliance Mobile Broadcast Services Enabler Suite (OMA BCAST), MediaFLO, Digital Video Broadcast IP Datacasting (DVB-IPDC), China Multimedia Mobile Broadcasting (CMMB), Multicast Broadcast Multimedia Service (MBMS), and LTE Evolved Multicast Broadcast Multimedia Service (eMBMS).

While the various embodiments are described with reference to mobile broadcast television services, this is but one example of its potential applicability. The embodiments may also be utilized in multicast networks, cable television, over-the-air television broadcast networks, satellite television networks, and any other communication system in which a plurality of communication services are aggregated in a central location and defined combinations of communication services are selected for broadcast to the end user. Thus, references to particular multicast technologies or mobile broadcast television technologies are not intended to limit the scope of the claims to such technologies unless specifically recited in a claim.

In some multicast technologies and broadcast television technologies the signals suitable for broadcast by a local broadcast or distribution network are assembled in a single processing center. An example of such a single processing center used in the descriptions of the various embodiments is implemented in the eMBMS system. Such a processing center receives and organizes content feeds from any of a number of content sources and providers. The processing center may encode the content feeds from various programs and services into the signal format of the local broadcast network. For example, in the case of mobile broadcast television technologies, program and service feeds are modified and encoded by a codec processor so that the services can be received and displayed on the small screens of mobile TV receivers (e.g., cellular telephones). This encoding of service feeds may include resizing images, configuring the data into the proper formats and packets for reception and processing by the mobile receivers, and compressing the video and audio information so that it requires less bandwidth (i.e., so it can be transmitted in fewer bits per second). The encoded program and service feeds may be combined into a multiplexed signal that is suitable for broadcast. This multiplex signal may be transmitted to a local multicast or broadcast network or networks, which then multicasts or broadcasts the signal for reception by receiver devices. Typically, a group of video and audio content streams are encoded and compressed to fit within the bandwidth capacity of the ultimate broadcast channel, i.e., the local broadcast network. To accomplish this generation of a multiplex signal from a plurality of services, a multiplexing process is employed which ensures that all services fit within a multicast or broadcast channel maximum bandwidth. Multicasts and broadcasts may be accomplished over a number of channels, each with its own bandwidth limitations.

An efficient method for generating the multiplex signal for broadcast employs techniques known as statistical multiplexing, which may be accomplished in a statistical multiplexer. A statistical multiplexer can take advantage of the continuously varying bandwidth requirements of typical program and service streams. For example, a statistical multiplexer allows a program or service stream that requires more bandwidth due to the amount of information in the signal to "borrow" bandwidth from other program or service streams that do not require as much bandwidth at any given moment. Should the total bandwidth requested by all of the encoded services exceed the distribution channel's bandwidth capacity, the statistical multiplexer requests one or more codec processors to re-encode the service at a lower bit-rate, temporarily sacrificing some quality in the re-encoded program streams. Selectively re-encoding program streams in an intelligent manner allows the broadcast system to maximize the number of program streams that can be supported by a given data channel. Statistical multiplexing is described in more detail below with reference to FIGS. 4A, 4B and 4C.

Because the bandwidth of each program stream continuously varies, dropping and adding program streams to broadcast channels downstream from the processing center (i.e., after completion of statistical multiplexing) is complicated. Any inserted (added) program stream or streams inserted into a multicast or broadcast channel must have less bandwidth than the (dropped) program stream(s) being replaced. However, the bandwidth required by and allocated to a particular program stream varies from instant to instant (such as from each one-second superframe to the next) due to the statistical multiplexing process. To accommodate this varying bandwidth, more bandwidth must be dropped than can be added to a multicast or broadcast channel in order to ensure that the total bandwidth capacity of the channel is not exceeded. This can be problematic in situations where there is inadequate bandwidth to accomplish the broadcast stream drop and add processing with reasonable quality. As demand for multicast and broadcast services increases, it is anticipated that maximizing the utilization of the multicast/broadcast bandwidth will become increasingly important.

A conventional process for creating a multiplex signal for broadcast that includes a number of services is illustrated in FIG. 1. Audio and video content feeds from a number of different programs or services a, b, c, n are provided to the broadcast center, step 2, 4, 6, 8, where the services are encoded, compressed and formatted in one or a plurality of codec processes, steps 10a, 10b, 10c, 10d. In their normal format, the service audio/video feeds may each represent several megabytes per second worth of information, which the codec processing compresses down to a much smaller information stream in a format suitable for transmission to the target receiver. For example, in the case of the MediaFLO mobile broadcast TV technology, a program service which may average 8 MB per second in unprocessed form may be compressed in the codec processing 10a, 10b, 10c, 10d into a stream of information in the range of about 100 kilobits per second at a minimum, to about 450 kilobits per second at a maximum. As is well known, transmitting audio and video content in encoded signals that contain more information (i.e., bits per second) will result in better received image and sound quality at the expense of transmission bandwidth. Decreasing the information content of a broadcast service stream allows more services to be carried within the same total bandwidth, but at the expense of audio/video quality.

To ensure that all of the encoded service feeds can be transmitted within the bandwidth of the system transmitter, the total bandwidth required by all of the encoded service feeds is calculated and compared to the available transmission bandwidth, such as the bandwidth for a particular broadcast channel, in a statistical multiplexing process 12. For example, in the MediaFLO system, the broadcast channel has a maximum bandwidth of approximately 5 Mb per second, so the total required bandwidth of all encoded services within the multiplex signal must be equal to or less than 5 Mb per second. If the total bandwidth of all encoded services exceeds the available bandwidth of the system transmitter, the statistical multiplexing process 12 may select one or more services for further re-encoding by the codec processors 10a, 10b, 10c, 10d to increase the data compression and request re-encoding of that selected service. In doing so the statistical multiplexer may communicate instructions back to the encoder or codec processor 10a, 10b, 10c, 10d defining how deeply to compress, or re-encode the selected service. A variety of methods, including statistical methods, may be used for selecting particular services for further compression. For example, services may be ordered in terms of a priority such that the service with the lowest priority is selected for further compression first, while higher priority services are afforded the best broadcast quality (i.e., allowed to have highest signal bandwidth, and thus the lowest degree of compression). As another example, the amount of data compression may be applied approximately equally to all services or to all low priority services so that no one service is compressed to the lowest level in a discriminatory manner.

The process of re-encoding a selected service feed to further compress the encoded file by re-performing the codec processing 10a, 10b, 10c, 10d, calculating the total required signal bandwidth, selecting a service for re-encoding, and instructing the encoder or codec regarding how deeply to compress or re-encode the selected service continues until the total required signal bandwidth for all encoded services will fit within the bandwidth of a particular multicast or broadcast channel. At this point, the encoded multiplexed services may be transmitted to one or more multicast or broadcast networks for transmission 14. This multiplexing process then repeats for another broadcast unit, such as the next transmission superframe.

This process of encoding services and statistically multiplexing a plurality of services to fit within the available transmission channel bandwidth may be repeated for every broadcast unit for the particular communication system. For example, the MediaFLO system transmits the multiplex signal in a superframe that is one second in duration, so the encoding and statistical multiplexing process may be repeated for every one second of MediaFLO broadcast content. Other broadcast systems may perform the process more frequently, such as once every image frame (which may be between 24 and 30 times per second) or once for every group of image frames. Repeating the encoding and statistical multiplexing process frequently is useful because the information content in typical audio and video services changes very frequently depending upon the varying nature of the content from instant to instant. For example, the information content in the video portion of a movie will change rapidly based upon the nature of the image. For example, scenes with little movement or edges, such as snow fields or walls, have low information content, whereas rapidly changing scenes, such as crowds or explosions, have significantly higher information content. Similarly, the information content in the audio portion of a service will fluctuate greatly depending upon the nature of the sound, such as dropping dramatically during periods of little or no sound.

Statistical multiplexing enables more services to be carried within the fixed amount of transmission bandwidth by taking advantage of the peaks and valleys in information content— and thus the required bandwidth—that occur in many types of multicast and broadcast services. While one service may require greater bandwidth to transmit the video and sound image of an action scene, such as an explosion, at that same instant other services may require only average or lower amounts of bandwidth. For example, a service that requires a large amount of bandwidth to convey images and sounds of an explosion in one second may require much less bandwidth to convey the stillness following the explosion in the next second. Statistical multiplexing provides for better overall user experience of a mobile TV broadcast because it enables services that temporarily require more bandwidth for acceptable video quality to borrow bandwidth from services that temporarily require less bandwidth. Thus, by performing the statistical multiplexing process across several services, a better fit of the data compression to the particular requirements of each service can be accomplished.

Figure 2:
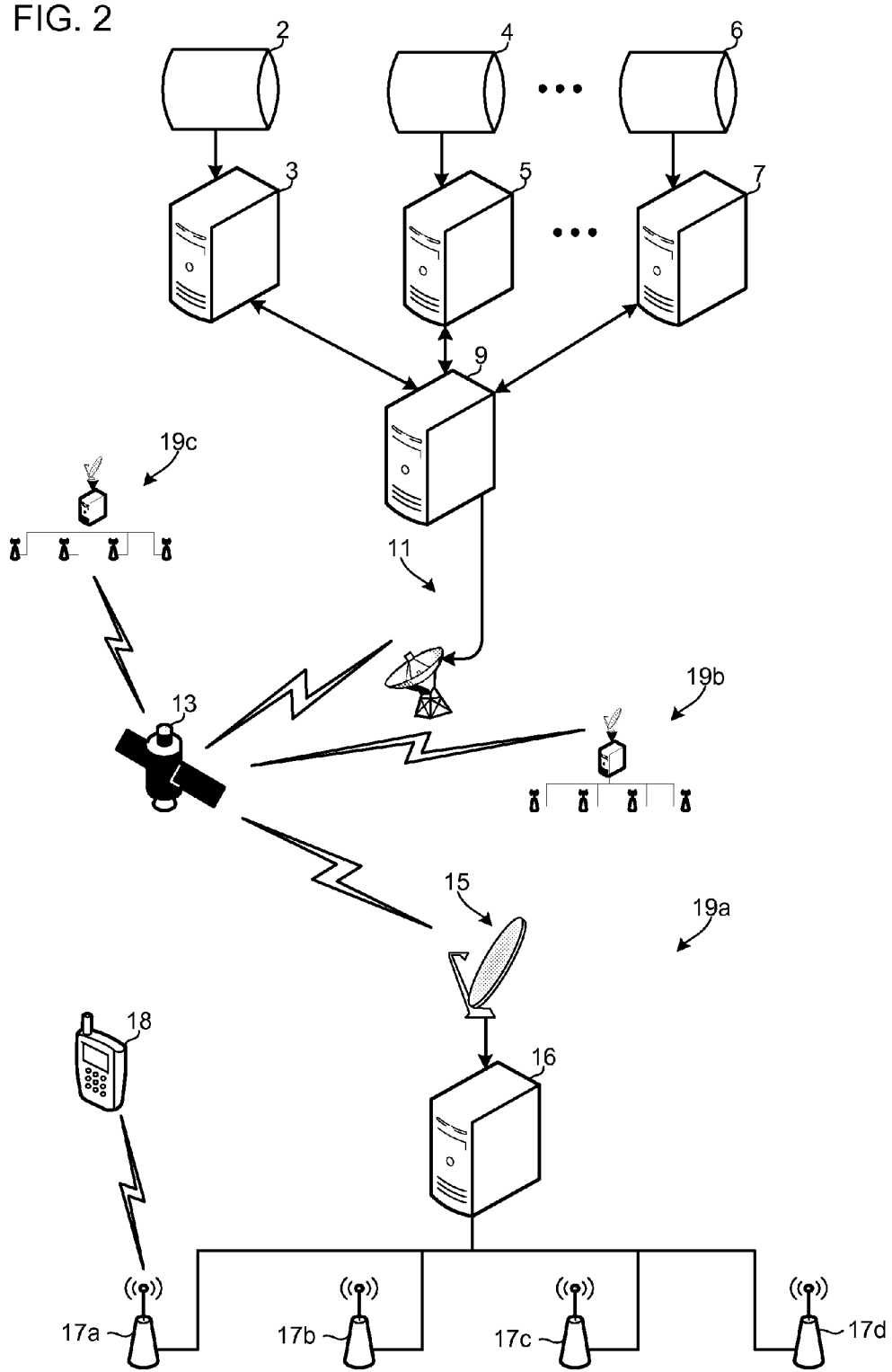
FIG. 2 is a system block diagram of a broadcast communication system suitable for use with the various embodiments.

A portion of the communication system architecture for a mobile TV broadcast system that may implement the various embodiments is illustrated in FIG. 2. A plurality of services for broadcast over the system may be received from a variety of data sources 2, 4, 6, such as large capacity data storage systems, Internet websites, content producer servers, and tangible storage media (e.g., DVD or videotape). The audio/video feeds of each service are processed in a codec processor 3, 5, 7, which may be a server or computer configured with software instructions to accomplish the codec process described above with reference to FIG. 1. The codec processing and computers capable of performing such processing are well-known in the video broadcast and electronic communication arts.

Results of the codec processing are provided to the statistical multiplexing processor 9, which may be a commercially available server or computer configured with software instructions to accomplish the statistical multiplexing processes of the various embodiments. The multiplex signal including all of the services for multicast or broadcast may be provided to a satellite ground station 11 which relays the multiplex signal via a communication satellite 13 to ground station receivers 15 associated with each of local broadcast networks 19a, 19b, 19c. The local multicast or broadcast networks receive the multiplex signal in a broadcaster system 16, which distributes the signal to each of a plurality of transmission antennas 17a, 17b, 17c, 17d.

The multiplex signal broadcast from the transmission antennas 17a, 17b, 17c, 17d can be received by mobile devices 18 which are configured with electronics and software to receive and process the signal in order to display a particular one of the plurality of services to the user. Typically, local broadcast networks 19a, 19b, 19c will be geographically dispersed with a single network serving a large metropolitan area, such as Boston, Los Angeles, New York, or Washington D.C.

In many situations, the local broadcaster system 16 may elect to not broadcast some of the content included in the multiplex signal, and thus may delete such content from the signals passed to the plurality of transmission antennas 17a, 17b, 17c, 17d. This may be accomplished when a particular service or program is of little relevance to the customers of the local broadcaster system 16. For example, a local broadcaster system in Boston may elect to drop or delete services carrying New York Yankee baseball games. Also, local broadcaster systems 16 may elect to include additional content in the signals passed to the plurality of transmission antennas 17a, 17b, 17c, 17d, such as programming that is of particular relevance to local subscribers. For example, a local broadcaster system in Boston may elect to add services carrying Boston Red Sox baseball games.

The communication system illustrated in FIG. 2 enables a single statistical multiplexing processor 9 to create a multiplex signal that includes sub-multiplexes or multiplex groups which can be broadcast in a plurality of different local markets. Accomplishing the single multiplexing process in a central location provides economies of scale, while enabling the statistical multiplexing process to be accomplished over a large number of service feeds in multiple sub-multiplexes or multiplex groups.

FIG. 3 illustrates a communication system 300 including functional entities for an enhanced Multimedia Broadcast Multicast Service (eMBMS) system that may be used to implement various embodiments. One or more content providers 302 may include one or more content sources, such as data sources 2, 4, 6, that provide various services to be transmitted. These services may be sent to a Broadcast Multicast Service Center (BM-SC) 304. The BM-SC 304 may multiplex the services sent to it and provide a multiplex signal to a Multimedia Broadcast Multicast Service gateway (MBMS-GW) 306 via a communication interface (SGmb) 320. In FIG. 3, SGmb 320 and other communication channels used for eMBMS signaling are illustrated as dashed lines, while bold lines, such as SGi-mb 322 between the BM-SC 304 and MBMS-GW 306, indicate communication channels used for eMBMS user traffic.

The MBMS-GW 306 may be connected with a node or eNB 17, such as a wireless transmitter, via an M1 interface 332. The M1 interface 332 may be a user plane interface and make use of Internet protocol (IP) multicast protocol for packet delivery. The eNB 17 may communicate with mobile devices 18 via an air interface, such as a Long Term Evolution (LTE) Uu (User equipment (UE) to Universal terrestrial radio access network (UTRAN)) interface 348. Other types of wireless and cellular telephone communication protocols and interfaces may also be used.

The MBMS-GW may also be connected to a Mobility Management Entity (MME) 308 via an Sm interface 324 for session control purposes, as is the discussed later. The MME 308 may be connected to the eNB 17 via an S1-MME interface 330. The MME may be connected to a Multi-cell/Multicast Coordination Entity (MCE) 310 via an M3 interface 326. The MCE 310 may be connected to the eNB 17 via an M2 interface 328. In alternate embodiments, one or more Multi-cell/Multicast Coordination Entities are 310 may be integrated with or within one or more eNBs 17.

The MBMS-GW 306 may be connected to a Radio Network Controller (RNC) 314 via an M1 interface 336. The RNC may be connected to a node NB 17 which may communicate with mobile devices 18 via an air interface, such as Uu 350. The MBMS-GW 306 may be connected to a Serving GPRS (General Packet Radio Service) Support Node (SGSN) 312 via an Sn Interface 334. The SGSN 312 may be connected with the RND 314 via an Iu interface 338.

The BM-SC 304 may communicate with a public data network (PDN) gateway (P-GW) 316 via an SGi interface 340. The P-GW 316 may be connected to a signaling gateway (SGW) 318 via an S5 interface 342. The SGW 318 may be connected to the MME 308 via an S11 interface 346. The SGW 318 may be connected to the eNB 17 via an S1-U interface 344.

The BM-SC 304 (or other service centers) may be responsible for statistically multiplexing the various services sent to it from content providers 302. Services may be statistically multiplexed in groups or subgroups to create multiplexes or sub-multiplexes. The benefits of statistical multiplexing are illustrated in FIGS. 4A, 4B and 4C. FIG. 4A illustrates the aggregate bandwidth of the plurality of services from transmission before statistical multiplexing, while FIG. 4B illustrates the aggregate bandwidth of the plurality of services from transmission before statistical multiplexing. In FIG. 4A, four services 402, 404, 406, and 408 are each allotted a constant amount of bandwidth, which may depend upon the QoS specified for the service by the service provider as well as its maximum information content. The constant bandwidth allotted is represented by the uniform width of the services 402, 404, 406, and 408. The total bandwidth 400 that would be required to carry these four services without multiplexing is the sum of each of the respective constant bandwidths.

As explained above, the actual bit rate of a service may vary over time such that a service's allotted bandwidth is not fully used, which can be leveraged by statistical multiplexing to make better use of the total bandwidth. For example, multiplex signal 420 shows the four services 402, 404, 406, and 408 after they have been statistically multiplexed. The aggregated bit rate or bandwidth 420 of the most multiplex signals is less than the combined bandwidth 400 of the original services.

As mentioned above, local broadcast networks may elect to delete some services from the multiplexed signal and may substitute other signals. When one service (e.g., service 402) is deleted from a number of services that have been statistically multiplexed together as a group to a group bandwidth maximum, the resulting bandwidth requirement of the remaining group of multiplex services 404, 406, 408 may vary over time as illustrated in FIG. 4C. This is because the multiplexing and encoding decisions that were made by the statistical multiplexor in order to fit all of the services within the group bandwidth adjust the bandwidth allocated to each service 404, 406, 408 differently depending upon its own instantaneous information content, the instantaneous content of other services within the same group, and the relative encoding priority applied to each service. In order to ensure that adding another service for broadcast in the same transmission channel as the remaining multiplex services 404, 406, 408 does not exceed the bandwidth capacity of the channel, some bandwidth margin 432 must be added to the average bandwidth 434 of the remaining multiplex services 404, 406, 408 in order to accommodate the occasional maximum bandwidth 436 of the group. This problem may be further exacerbated if each of the multiplexed services 402, 404, 406, 408 is transmitted on different transmission channels by the local broadcaster. To avoid these problems, the various embodiments provide mechanisms for ensuring that services which have been statistically multiplex as a group are identified to local broadcasters so they can ensure that such services are multicast or broadcast over the same transmission channel.

Figure 5:
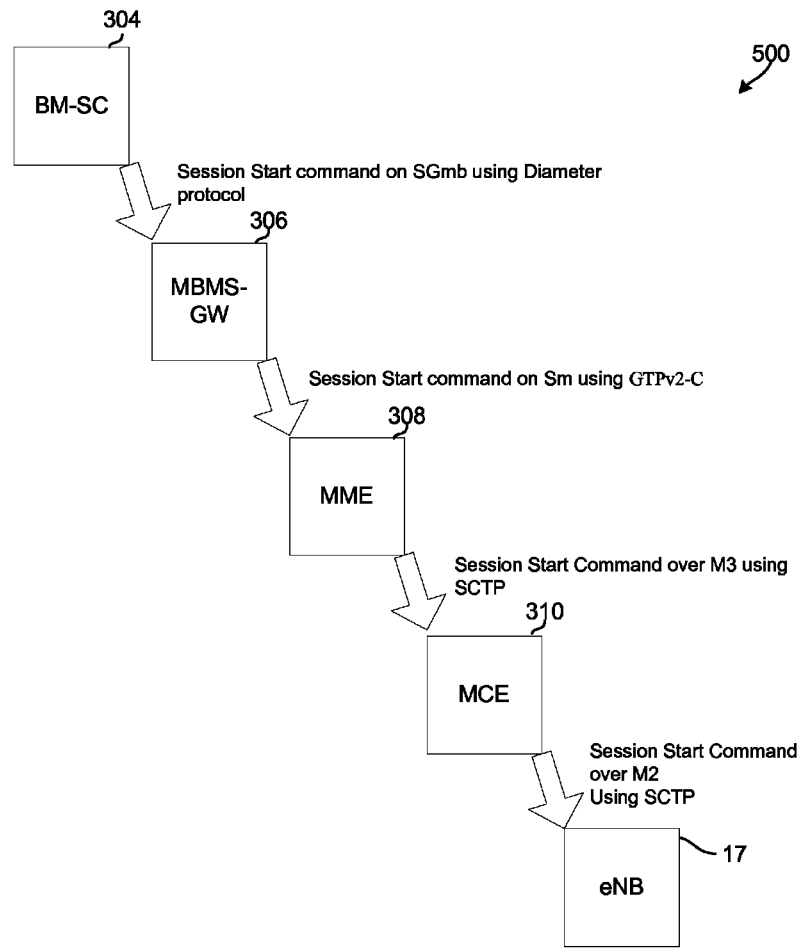
FIG. 5 is a system block diagram showing the propagation of a session start command through a communication system.

The BM-SC 304 may manage the scheduling of broadcast and multicast sessions. A session may correspond to a service to be broadcast or multicast. Session control signaling, such as messages for session initiation and termination, may propagate to one or more eNBs 17 from the BM-SC 304 through a signal path 500 as illustrated in FIG. 5. The BM-SC 304 may initiate session establishment by sending a Session Start command through the SGmb interface 320, such as by using a Diameter protocol message, to the MBMS-GW 306. The MBMS-GW 306 may send the Session Start command to the MME 308 via the Sm interface 324, such as by using a GTPv2-C interface. The MME 308 may send the Session Start command to the MCE 310 via the M3 interface 326, such as by using an SCTP message. The MCE 310 may send the Session Start command to the eNBs 17 via the M2 interface 328, such as by using an SCTP message.

FIG. 6 illustrates an exemplary format for a Session Start command 600. Similar formatting may be used for Session Update or Session Stop commands The Session Start commands 600 may include Quality of Service (QoS) information in a [QoS-Information] information element (IE) 602 as shown in exemplary format 600.

FIG. 7 illustrates an exemplary format for a QoS IE 700. The QoS IE 700 format may include rows corresponding to parameters associated with the exemplary QoS IE, such as QCI, GBR QoS Information, and Allocation and Retention Priority. The QoS IE 700 format may also include columns identifying how each parameter may be set.

Various embodiments may modify the exemplary message formats 600 and 700 in order to preserve the benefits of statistical multiplexing. As described above, services may be statistically multiplexed to optimize bandwidth utilization. Statistical multiplexing may occur in the BM-SC 304, and the multiplex signal may be sent to the MBMS-GW 306 and to the eNBs 17. The MCE 310 or other entity may coordinate the services in the multiplex signal which are to be transmitted together over the available channels. However, at this point, these services have already been statistically multiplexed together as a group and encoded relative to one another to maximize use of the group bandwidth. To retain the bandwidth utilization benefits of statistical multiplexing, services that were multiplexed together may be transmitted together in a common channel. The various embodiments provide mechanisms for communicating how services should be grouped together for transmission.

FIG. 8 illustrates an exemplary format for a Session Start command 800. The session start command 800 format may be similar to the Session Start command 600 format, but further include a [Group ID] IE 802. In various embodiments, the [Group ID] IE 802 may indicate to an MCE 310 or other entity that the session to be started is for a service in a particular group. The MCE 310 or other entity may then use this group ID information to group services with the same [Group ID] IE 802 together for multicast or broadcast over the same transmission channel.

The BM-SC 304 may manage session control signaling and statistical multiplexing. The BM-SC 304 may generate Session Start messages 800 with a format that includes a [Group ID] IE 802 based on the groups of services that have been statistical multiplexed together. For example, the Session Start messages for services statistically multiplexed together may include the same value for the [Group ID] IE 802.

Alternate embodiments may modify the Session Start command to provide different mechanisms for identifying sessions that have been statistically multiplexed together. For example, FIG. 9 illustrates an embodiment Session Start command format 900 which includes a group ID as part of the [QoS-Information] IE 902 rather than as a separate IE as in embodiment format 800 illustrated in FIG. 8. FIG. 10 illustrates an embodiment [QoS-Information] IE format 1000 which includes an additional Group ID parameter as part of the [QoS-Information] IE 902.

In another embodiment, the identification of sessions included within the same statistical multiplexing group may be identified in a new Group Start message which specifies how services should be grouped for multicast or broadcast transmission. The Group Start message may be formatted similar to the Start Session commands, but may also be generated in other formats. The Group Start message may include a list or other data structure of services associated with a corresponding group for each service. The Group Start message may be propagated from the BM-SC 304 to the MCE 310. Further embodiments may involve additional messages to modify or update the grouping of services.

Further embodiments may communicate to the MCE 310 or other entity the aggregate QoS requirements for a group of services. FIG. 11 illustrates an exemplary format for a Session Start command 1100 with a [Group ID] IE 802 and a [Group-QOS-Information] IE 1102. In this embodiment, the [Group-QOS-Information] IE 1102 may indicate the aggregate QoS requirements for a group of services associated with the group identified by the [Group ID] IE 802.

FIG. 12 illustrates an exemplary format for a Session Start command 1200 including a [QoS-Information] IE 1202 with fields for Group-Max-Requested-Bandwidth-DL and Group-Guaranteed-Bitrate-DL. The Group-Max-Requested-Bandwidth-DL and the Group-Guaranteed-Bitrate-DL fields may be similar to the Max-Requested-Bandwidth-DL and Guaranteed-Bitrate-DL fields in the [QoS-Information] IE 1202, except that these fields may apply to the aggregate QoS requirements for a group of services rather than just one session.

FIG. 13 illustrates an exemplary format for a [QoS-Information] IE 1300 including an additional Group GBR QoS Information parameter as part of the [QoS-Information] IE 1202. The Group GBR QoS Information parameter may include the Group-Max-Requested-Bandwidth-DL and Group-Guaranteed-Bitrate-DL fields.

Further embodiments may include generation and transmission of a new Group QoS message along with the multiplexed signals. This Group QoS message may provide the aggregate QoS requirements for one or more groups of co-multiplexed services. In some embodiments, the Group QoS message may be combined with the Group Start message for indicating how services should be grouped described above. In further embodiments, the Group QoS message may provide the aggregate QoS requirements for various subsets of services or subsets of groups of services. Further embodiments may utilize additional messages to modify or update the contents of the Group QoS message.

Figure 14:
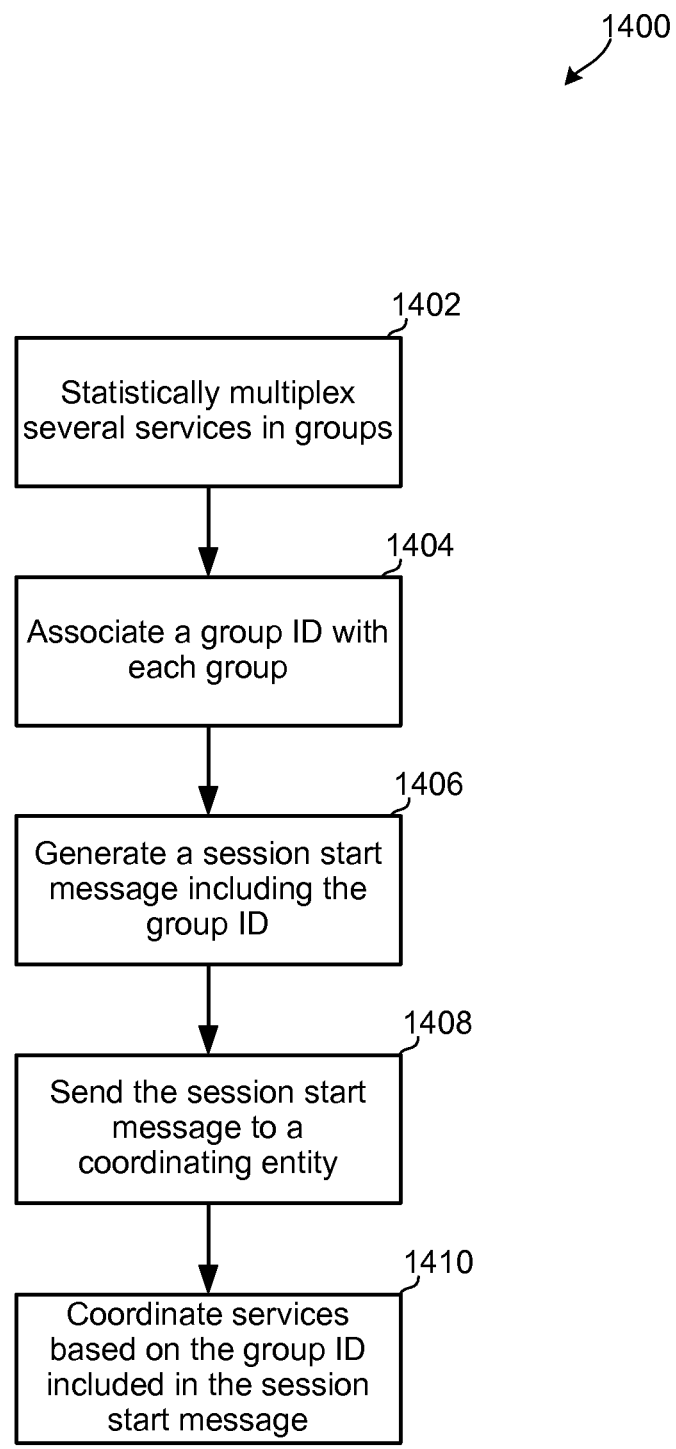
FIG. 14 is a process flow diagram of an embodiment method for including a group ID in a session start message.

FIG. 14 illustrates an embodiment method 1400 for identifying statistically multiplexed groups of services. A plurality of services may be statistically multiplexed together as a group in step 1402. A group ID may be associated with the multiplexed group of services in step 1404. A session start message may be generated in step 1406. If the session to be started corresponds to one of the services in the multiplexed group of services, the session start message may include the associated group ID. The session start message may be sent to a coordinating entity (e.g., the MCE 310) in step 1408. The multiplexed services may be coordinated in channels for transmission based on the group ID included in the session start message in step 1410. This coordination may enable services to be grouped based on the statistical multiplex group.

Figure 15:
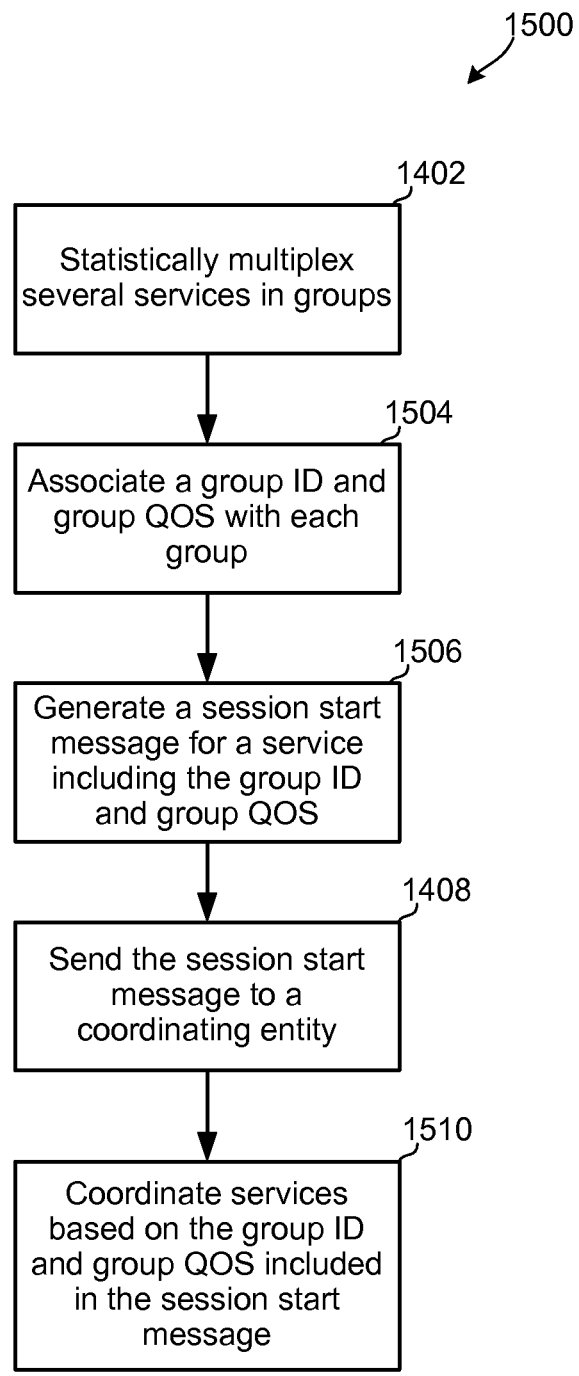
FIG. 15 is a process flow diagram of an embodiment method for including a group ID and group QoS in a session start message.

FIG. 15 illustrates an embodiment method 1500 for providing group QoS requirements for a statistically multiplexed group of services. A plurality of services may be statistically multiplexed in step 1402. A group ID and a group QoS may be associated with the multiplexed group of services in step 1504. The group QoS may include a single field or may include multiple fields, such as Max-Requested-Bandwidth-DL and Guaranteed-Bitrate-DL fields. A session start message may be generated in step 1506. If the session to be started corresponds to one of the services in the multiplexed group of services, the session start message may include the associated group ID and group QoS. The session start message may be sent to a coordinating entity (e.g., the MCE 310) in step 1408. The multiplexed services may be coordinated in channels for transmission based on the group ID and group QoS included in the session start message in step 1510. This coordination may enable services to be grouped based on the statistical multiplex group.

Figure 16:
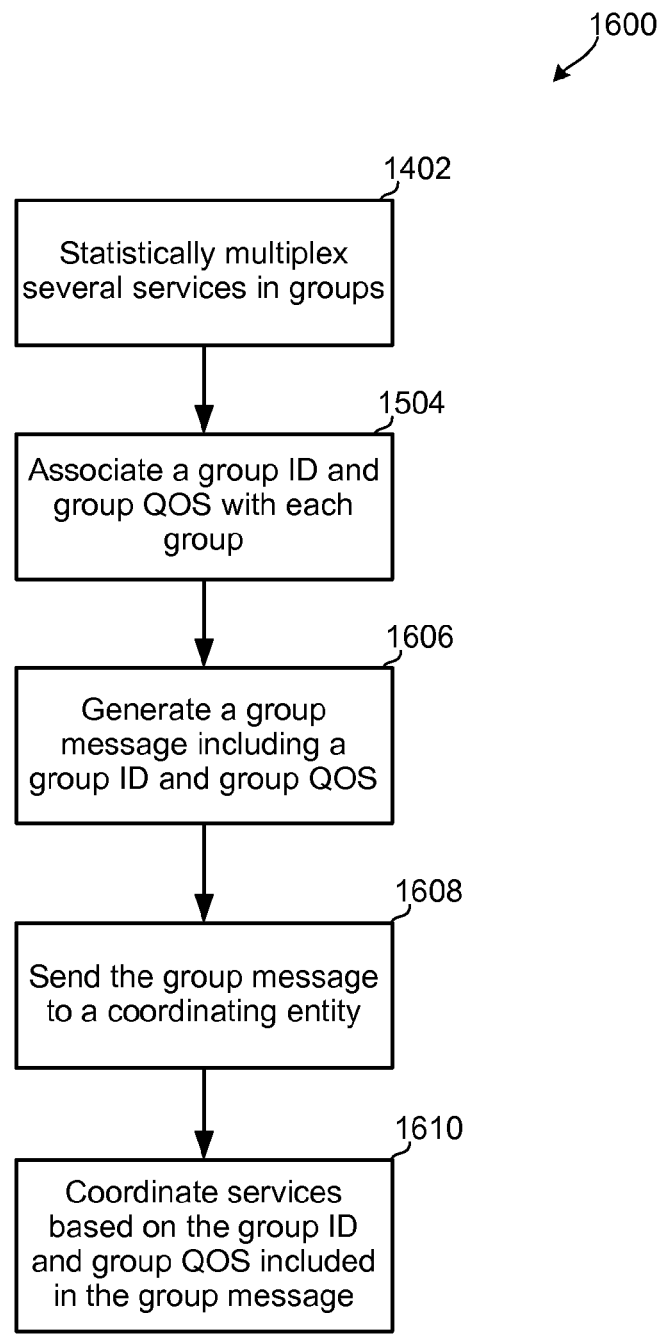
FIG. 16 is a process flow diagram of an embodiment method for including a group ID and group QoS in a group message.

FIG. 16 illustrates an alternate embodiment method 1600 for providing group QoS requirements for a statistically multiplexed group of services by a group message. A plurality of services may be statistically multiplexed in step 1402. A group ID and a group QoS may be associated with the multiplexed group of services in step 1504. The group QoS may include a single field or may include multiple fields, such as Max-Requested-Bandwidth-DL and Guaranteed-Bitrate-DL fields. A group message may be generated in step 1606. The group message may include the group ID and group QoS. In some embodiments, a group message may include multiple group IDs and corresponding group QoS requirements. The group message may be sent to a coordinating entity (e.g., the MCE 310) in step 1608. The multiplexed services may be coordinated in channels for transmission based on any group IDs or group QoS requirements included in the group message in step 1610. This coordination may enable services to be grouped based on the statistical multiplex group.

In a further embodiment, statistical multiplexing of services may be accomplished on a subgroup basis in which the subgroups are formed of a subset of the sessions in a group. Thus, statistical multiplexing may be accomplished in a hierarchical manner address multiplexing of subgroups of services that together make up a group that is statistically multiplexed together so that services are grouped based on the statistical multiplex group. A statistically multiplexed group may thus include a number of subgroups or a number of sessions and one or more subgroups. This organization and conduct of statistical multiplexing may provide greater flexibility for fitting a variety of services into a plurality of broadcast channels and within group transmission channels. In order to extend the benefits of the embodiment methods to such subgroups, in an embodiment the group message discussed above may further include information regarding subgroup quality of service requirements, as well as other properties and requirements.

Alternate embodiment methods may include various combinations of different IEs or IE parameters or fields in a start session message indicating groups of services or QoS requirements. Further embodiments may include one or multiple messages indicating groups of services or QoS requirements. Further embodiments may include various IEs or IE parameters or fields in a start session in combination with one or multiple messages to indicate groups of services or QoS requirements.

The codec processor, statistical multiplexer and methods for identifying and coordinating groups of co-multiplexed services may be implemented on a server or servers in a processing center, in local broadcast network, or partially in both the processing center and the local broadcast network. Server processor-executable instructions for performing the operations of the codec processor, statistical multiplexer and methods for identifying and coordinating groups of co-multiplexed services may be stored on one or more non-transitory server-readable media, such as a hard disc, DVD or compact disk.

Figure 17:
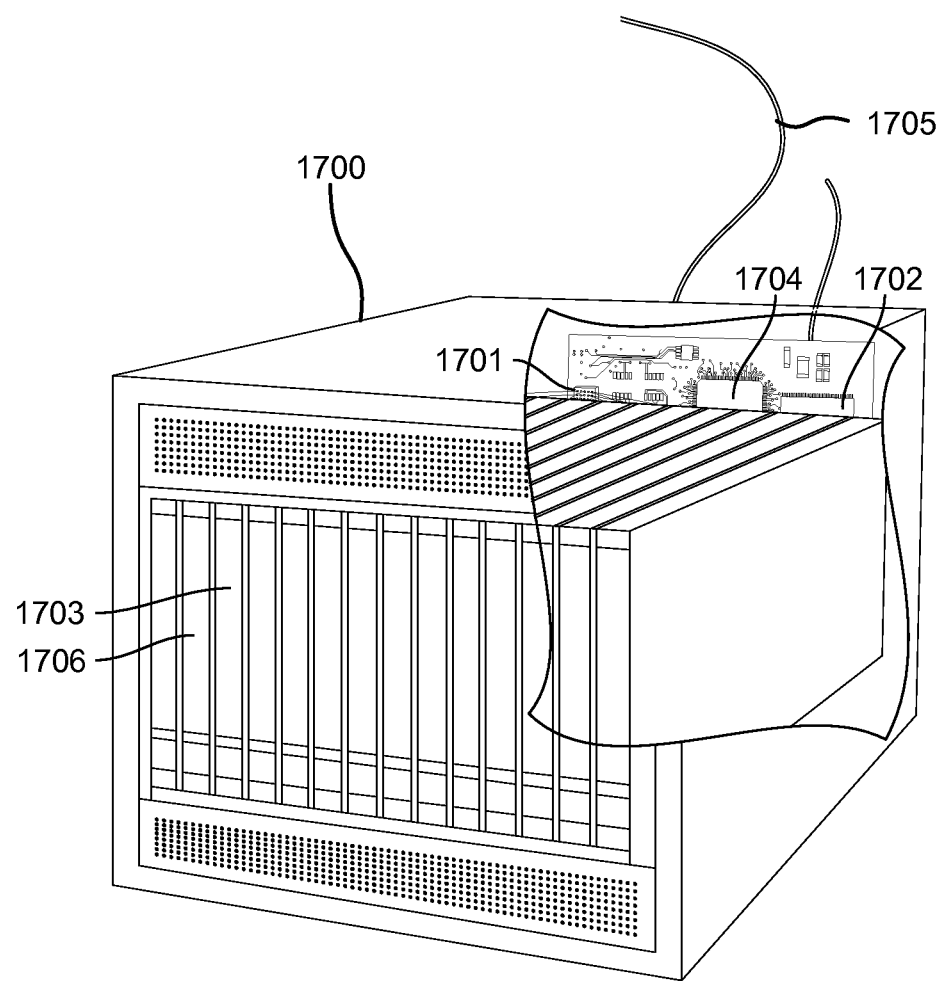
FIG. 17 is a component block diagram of a computer suitable for accomplishing the various embodiment methods.

The codec processor, statistical multiplexer and methods for identifying and coordinating groups of co-multiplexed services may be implemented utilizing any of a variety of general purpose servers, such as the server 1700 illustrated in FIG. 17. Such a server 1700 typically includes a processor 1701 coupled to volatile memory 1702 and a large capacity nonvolatile memory, such as a disk drive 1703. The computer 1700 may also include a floppy disc drive and/or a compact disc (CD) drive 1706, or other electronic data readers/writers (e.g., memory card readers), coupled to the processor 1701. The computer 1700 may also include network access ports 1704 coupled to the processor 1701 for communicating with a network 1705, such as the Internet.

The processors 1701 in the server 1700 may be any programmable microprocessor, microcomputer or multiple processor chip or chips that can be configured by software instructions (applications) to perform a variety of functions, including the functions of the various embodiments described herein. Typically, software applications may be stored in the internal memory (e.g. volatile memory 1702 or disc drives 1703) before they are accessed and loaded into the processor 1701.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more processor-executable instructions or code on a non-transitory computer-readable medium. The steps of a method or algorithm disclosed herein may be embodied in a processor-executable software module executed which may reside on a non-transitory computer-readable medium. Non-transitory computer-readable media includes both computer storage media and communication media including any medium that facilitates transfer of a computer program from one place to another. A non-transitory storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for multicasting or broadcasting a plurality of services, comprising:
    forming statistical multiplex groups around each of a plurality of groups of services;
    associating a group ID and group quality of service requirements with each of the statistical multiplex groups, wherein the group quality of service requirements comprise a group requested bandwidth downlink (DL) and a group guaranteed bitrate DL associated with the group ID;
    providing a session start message corresponding to a service, the session start message comprising the group ID and the group quality of service requirements associated with a statistical multiplex group formed around a group of services including the service corresponding to the session start message; and
    coordinating services into a plurality of channels based on the session start message such that services in the statistical multiplex groups are grouped for at least one of multicast and broadcast on a common transmission channel based on the group ID and the group quality of service requirements associated with each of the statistical multiplex groups.

2. The method of claim 1, wherein the session start message comprises the group ID and the group quality of service requirements as separate information elements.

3. The method of claim 1, wherein the session start message comprises the group ID and the group quality of service requirements as a field within an information element.

4. A method for multicasting or broadcasting a plurality of services, comprising:
    forming statistical multiplex groups around each of a plurality of groups of services;
    associating a group ID and group quality of service requirements with each of the statistical multiplex groups, wherein the group quality of service requirements comprise a group requested bandwidth downlink (DL) and a group guaranteed bitrate DL associated with the group ID;
    providing a group message comprising a data structure including each group ID and the statistical multiplex group, the group of services, and the group quality of service requirements associated with each group ID; and
    coordinating services into a plurality of channels based on the group message such that services in the statistical multiplex groups are grouped for at least one of multicast and broadcast on a common transmission channel based on the group ID and the group quality of service requirements associated with each of the statistical multiplex groups.

5. The method of claim 4, wherein subgroup quality of service requirements are also included in the group message, and wherein subgroups are formed of a subset of a plurality of sessions in a group.

6. A server, comprising a processor configured with processor executable instructions to perform operations comprising:
- forming statistical multiplex groups around each of a plurality of groups of services;
- associating a group ID and group quality of service requirements with each of the statistical multiplex groups, wherein the group quality of service requirements comprise a group requested bandwidth downlink (DL) and a group guaranteed bitrate DL associated with the group ID;
- providing a session start message corresponding to a service, the session start message comprising the group ID and the group quality of service requirements associated with a statistical multiplex group formed around a group of services including the service corresponding to the session start message; and
- coordinating services into a plurality of channels based on the session start message such that services in the statistical multiplex groups are grouped for at least one of multicast and broadcast on a common transmission channel based on the group ID and the group quality of service requirements associated with each of the statistical multiplex groups.

7. The server of claim 6, wherein the processor is further configured with processor-executable instructions such that the session start message comprises the group ID and the group quality of service requirements as separate information elements.

8. The server of claim 6, wherein the processor is further configured with processor-executable instructions such that the session start message comprises the group ID and the group quality of service requirements as a field within an information element.

9. A server, comprising a processor configured with processor executable instructions to perform operations comprising:
- forming statistical multiplex groups around each of a plurality of groups of services;
- associating a group ID and group quality of service requirements with each of the statistical multiplex groups, wherein the group quality of service requirements comprise a group requested bandwidth downlink (DL) and a group guaranteed bitrate DL associated with the group ID;
- providing a group message comprising a data structure including each group ID and the statistical multiplex group, the group of services, and the group quality of service requirements associated with each group ID; and
- coordinating services into a plurality of channels based on the group message such that services in the statistical multiplex groups are grouped for at least one of multicast and broadcast on a common transmission channel based on the group ID and the group quality of service requirements associated with each of the statistical multiplex groups.

10. The server of claim 9, wherein the processor is further configured with processor-executable instructions such that subgroup quality of service requirements are also included in the group message, and wherein subgroups are formed of a subset of a plurality of sessions in a group.

11. A server, comprising:
- means for forming statistical multiplex groups around each of a plurality of groups of services;
- means for associating a group ID and group quality of service requirements with each of the statistical multiplex groups, wherein the group quality of service requirements comprise a group requested bandwidth downlink (DL) and a group guaranteed bitrate DL associated with the group ID;
- means for providing a session start message corresponding to a service, the session start message comprising the group ID and the group quality of service requirements associated with a statistical multiplex group formed around a group of services including the service corresponding to the session start message; and
- means for coordinating services into a plurality of channels based on the session start message such that services in the statistical multiplex groups are grouped for at least one of multicast and broadcast on a common transmission channel based on the group ID and the group quality of service requirements associated with each of the statistical multiplex groups.

12. The server of claim 11, wherein means for providing a session start message corresponding to a service comprises means for providing a session start message that includes the group ID and the group quality of service requirements as separate information elements.

13. The server of claim 11, wherein means for providing a session start message corresponding to a service comprises means for providing a session start message that includes the group ID and the group quality of service requirements as a field within an information element.

14. A server, comprising:
- means for forming statistical multiplex groups around each of a plurality of groups of services;
- means for associating a group ID and group quality of service requirements with each of the statistical multiplex groups, wherein the group quality of service requirements comprise a group requested bandwidth downlink (DL) and a group guaranteed bitrate DL associated with the group ID;
- means for providing a group message comprising a data structure including each group ID and the statistical multiplex group, the group of services, and the group quality of service requirements associated with each group ID; and
- means for coordinating services into a plurality of channels based on the group message such that services in the statistical multiplex groups are grouped for at least one of multicast and broadcast on a common transmission channel based on the group ID and the group quality of service requirements associated with each of the statistical multiplex groups.

15. The server of claim 14, wherein means for providing a group message comprises means for providing a group message further comprising subgroup quality of service requirements, and in which subgroups are formed of a subset of a plurality of sessions in a group.

16. A non-transitory server readable medium having stored thereon server processor-executable instructions configured to cause a server processor to perform operations comprising:
- forming statistical multiplex groups around each of a plurality of groups of services;
- associating a group ID and group quality of service requirements with each of the statistical multiplex groups, wherein the group quality of service requirements comprise a group requested bandwidth downlink (DL) and a group guaranteed bitrate DL associated with the group ID;
- providing a session start message corresponding to a service, the session start message comprising the group ID and the group quality of service requirements associated with a statistical multiplex group formed around a group of services including the service corresponding to the session start message; and coordinating services into a plurality of channels based on the session start message such that services in the statistical multiplex groups are grouped for at least one of multicast and broadcast on a common transmission channel based on the group ID and the group quality of service requirements associated with each of the statistical multiplex groups.

17. The non-transitory server readable medium of claim 16, wherein the stored server processor-executable instructions are further configured to cause a server processor to perform operations such that the session start message comprises the group ID and the group quality of service requirements as separate information elements.

18. The non-transitory server readable medium of claim 16, wherein the stored server processor-executable instructions are further configured to cause a server processor to perform operations such that the session start message comprises the group ID and the group quality of service requirements as a field within an information element.

19. A non-transitory server readable medium having stored thereon server processor-executable instructions configured to cause a server processor to perform operations comprising:
forming statistical multiplex groups around each of a plurality of groups of services;
associating a group ID and group quality of service requirements with each of the statistical multiplex groups, wherein the group quality of service requirements comprise a group requested bandwidth downlink (DL) and a group guaranteed bitrate DL associated with the group ID;
providing a group message comprising a data structure including each group ID and the statistical multiplex group, the group of services, and the group quality of service requirements associated with each group ID; and
coordinating services into a plurality of channels based on the group message such that services in the statistical multiplex groups are grouped for at least one of multicast and broadcast on a common transmission channel based on the group ID and the group quality of service requirements associated with each of the statistical multiplex groups.

20. The non-transitory server readable medium of claim 19, wherein the stored server processor-executable instructions are further configured to cause a server processor to perform operations such that subgroup quality of service requirements are also included in the group message, and wherein subgroups are formed of a subset of a plurality of sessions in a group.

21. A communication system, comprising:
a processing center comprising a first server; and
a local broadcast network comprising a second server,
wherein the first server is configured with a set of server-executable instructions to perform a plurality of operations comprising:
forming statistical multiplex groups around each of a plurality of groups of services;
associating a group ID and group quality of service requirements with each of the statistical multiplex groups, wherein the group quality of service requirements comprise a group requested bandwidth downlink (DL) and a group guaranteed bitrate DL associated with the group ID;
providing a session start message corresponding to a service, the session start message comprising the group ID and the group quality of service requirements associated with a statistical multiplex group formed around a group of services including the service corresponding to the session start message; and
wherein the second server is configured with a set of server-executable instructions to perform a plurality of operations comprising:
coordinating services into a plurality of channels based on the session start message such that services in the statistical multiplex groups are grouped for at least one of multicast and broadcast on a common transmission channel based on the group ID and the group quality of service requirements associated with each of the statistical multiplex groups.

22. The system of claim 21, wherein the session start message comprises the group ID and the group quality of service requirements as separate information elements.

23. The system of claim 21, wherein the session start message comprises the group ID and the group quality of service requirements as a field within an information element.

24. A communication system, comprising:
a processing center comprising a first server; and
a local broadcast network comprising a second server,
wherein the first server is configured with a set of server-executable instructions to perform a plurality of operations comprising:
forming statistical multiplex groups around each of a plurality of groups of services;
associating a group ID and group quality of service requirements with each of the statistical multiplex groups, wherein the group quality of service requirements comprise a group requested bandwidth downlink (DL) and a group guaranteed bitrate DL associated with the group ID;
providing a group message comprising a data structure including each group ID and the statistical multiplex group, the group of services, and the group quality of service requirements associated with each group ID; and
wherein the second server is configured with a set of server-executable instructions to perform a plurality of operations comprising:
coordinating services into a plurality of channels based on the group message such that services in the statistical multiplex groups are grouped for at least one of multicast and broadcast on a common transmission channel based on the group ID and the group quality of service requirements associated with each of the statistical multiplex groups.

25. The system of claim 24, wherein subgroup quality of service requirements are also included in the group message, and wherein subgroups are formed of a subset of a plurality of sessions in a group.

* * * * *